(12) United States Patent
Ellath Meethal et al.

(10) Patent No.: US 12,523,971 B2
(45) Date of Patent: Jan. 13, 2026

(54) MACHINE CONTROLLER AND METHODS FOR CONFIGURING AND USING THE MACHINE CONTROLLER

(71) Applicant: Siemens Aktiengesellschaft, Munich (DE)

(72) Inventors: Rishith Ellath Meethal, Bavaria (DE); Birgit Obst, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 312 days.

(21) Appl. No.: 18/015,831

(22) PCT Filed: Jul. 13, 2021

(86) PCT No.: PCT/EP2021/069477
§ 371 (c)(1),
(2) Date: Jan. 12, 2023

(87) PCT Pub. No.: WO2022/023024
PCT Pub. Date: Feb. 3, 2022

(65) Prior Publication Data
US 2023/0185257 A1    Jun. 15, 2023

(30) Foreign Application Priority Data

Jul. 31, 2020   (EP) ..................... 20189012

(51) Int. Cl.
*G05B 13/04*    (2006.01)
*G05B 13/02*    (2006.01)

(52) U.S. Cl.
CPC ......... *G05B 13/048* (2013.01); *G05B 13/027* (2013.01)

(58) Field of Classification Search
CPC .............. G05B 13/048; G05B 13/027
(Continued)

(56) References Cited

U.S. PATENT DOCUMENTS 10,635,088 B1    4/2020   Bandara et al.
2019/0308315 A1*  10/2019   Radrich ................ B25J 9/163
(Continued)

FOREIGN PATENT DOCUMENTS

EP         3671493 A1    6/2020
WO   WO 2020097216 A1    5/2020

OTHER PUBLICATIONS

M. Raissi: "Physics-informed neural networks: A deep learning framework for solving forward and inverse problems involving nonlinear partial differential Equations", in Journal of Computational Physics 378(2019), pp. 686-707.
(Continued)

*Primary Examiner* — Jigneshkumar C Patel
(74) *Attorney, Agent, or Firm* — Schmeiser, Olsen & Watts, LLP

(57) ABSTRACT

A machine controller, geometry data and measured physical data of a machine is provided. The geometry data and the physical data are input to a machine learning module and to a simulation module of the machine controller. By the input data, the simulation module generates first values of a first physical property of a component of the machine on a discretized grid. Furthermore, an evaluator is provided for evaluating a physical compatibility of the first values with second values of a second physical property of the component, and for generating a residual quantifying the compatibility. The evaluator evaluates the compatibility of the first values with output data of the machine learning module and generates a resulting residual. Moreover, the machine learning module is trained to minimize the resulting residual, thus configuring the machine controller for controlling the machine by the output data of the trained machine learning module.

13 Claims, 1 Drawing Sheet

(58) Field of Classification Search
USPC .......................................................... 700/29
See application file for complete search history.

(56) References Cited

U.S. PATENT DOCUMENTS

| | | | |
|---|---|---|---|
| 2020/0142365 A1 | 5/2020 | Sharma et al. | |
| 2020/0202052 A1 | 6/2020 | Cunha et al. | |
| 2020/0401052 A1* | 12/2020 | Weijden | H01L 22/20 |
| 2021/0405544 A1* | 12/2021 | Werkman | G03F 7/70508 |

OTHER PUBLICATIONS

Qiming Zhu et al: "Machine learning for metal additive manufacturing: Predicting temperature and melt pool fluid dynamics using physics-informed neural networks"; arxiv.org; Cornell University Library; 201; Olin Library Cornell University Ithaca, NY; 14853; Jul. 28, 2020; XP081750844.

PCT International Search Report and Written Opinion of International Searching Authority mailed Oct. 13, 2021 corresponding to PCT International Application No. PCT/E P2021/069477 filed Jul. 13, 2021.

* cited by examiner

MACHINE CONTROLLER AND METHODS FOR CONFIGURING AND USING THE MACHINE CONTROLLER

CROSS-REFERENCE TO RELATED APPLICATIONS

This application claims priority to PCT Application No. PCT/EP2021/069477, having a filing date of Jul. 13, 2021, which claims priority to EP Application No. 20189012.6, having a filing date of Jul. 31, 2020, the entire contents both of which are hereby incorporated by reference.

FIELD OF TECHNOLOGY

The following relates to a redundant power supply, in particular for data centers, and method and computer program for the operation thereof.

BACKGROUND

Complex machines like motors, turbines, robots, power plants, production plants, combustion engines, or vehicles usually require sophisticated control or monitoring strategies in order to operate the machine in a productive and stable operating range and to predict possible malfunctions. For implementing such control or monitoring strategies contemporary machine controllers often use numerical simulators for simulating dynamic state and behavior of a respective machine during runtime. In particular, mechanical failures caused by fatigue or external effects can be effectively reduced by preventive and predictive maintenance based on a runtime simulation of the machine. Such runtime simulations of a machine are often denoted as digital twin of the machine.

In many cases, runtime simulations provide a specification of an actual state of a machine along with a prediction of future states, e.g., regarding degradation or malfunctions. However, it usually requires massive computational resources to run detailed simulations in real-time.

To cope with the computational demands several strategies are known up to now:

According to a first known approach, so-called reduced order models may be used. These are approximate models obtained by a reduction of the machine's state space. Reduced order models are useful for real-time simulations and/or in case of limited computational resources. The reduction of state space, however, often entails higher simulation errors compared to full order models.

According to a further approach, a surrogate model based on machine learning may be used. Such a surrogate model is trained to reproduce the simulation results of the simulator. After the training, the surrogate model can replace the simulator. However, the black-box nature of such a machine learning model makes simulations risky. In particular, if the machine or the digital twin reaches states which are only little covered by the training data, the predicted output of the surrogate model may be wrong. This is because a machine learning model usually learns input-output combinations without considering the physics behind it.

According to a further approach, a so-called physics informed neural network may be used. Such networks are described in the publication "Physics-informed neural networks: A deep learning framework for solving forward and inverse problems involving nonlinear partial differential Equations", by Raissi, Maziar, Paris Perdikaris, and George E. Karniadakis, in Journal of Computational Physics 378 (2019), pages 686-707. However, up to now it is not clear whether physics informed neural networks are competitive for real-time simulations. Moreover, they have to be expensively re-trained when physical constraints will change.

SUMMARY

An aspect relates to a method for configuring a machine controller, a method for controlling a machine, and a corresponding machine controller, that allow for a higher accuracy and/or require less computational effort for predictive controlling.

According to a first aspect of embodiments of the invention, a machine controller comprising a machine learning module and a simulation module is configured. For that purpose, geometry data and measured physical data of a machine to be controlled are received. In particular, the machine may be a motor, a turbine, a robot, a power plant, a production plant, a combustion engine, or a vehicle. The geometry data and the physical data are input to the machine learning module and to the simulation module as input data. By the input data, the simulation module generates first values of at least one first physical property of a component of the machine on a discretized grid. Furthermore, an evaluator is provided for evaluating a physical compatibility of the first values with second values of at least one second physical property of the component different from the at least one first physical property, and for generating a residual quantifying the compatibility. The evaluator evaluates the compatibility of the first values with output data of the machine learning module and generates a resulting residual. Moreover, the machine learning module is trained to minimize the resulting residual, thus configuring the machine controller for controlling the machine by the output data of the trained machine learning module.

According to a second aspect of embodiments of the invention, a machine is controlled by a machine controller configured as specified above. For that purpose, operational data are received from the machine and input as input data to the trained machine learning module and to the simulation module. The simulation module generates by the input data first values of the at least one first physical property. Furthermore, the trained machine learning module outputs output data as predicted second values of the at least one second physical property. With that, the evaluator generates a resulting residual quantifying the compatibility of the first values with the predicted second values. By the predicted second values and the resulting residual the machine is controlled.

For executing the inventive methods, a machine controller, a computer program product (non-transitory computer readable storage medium having instructions, which when executed by a processor, perform actions), and a—non-transient—computer readable storage medium is provided.

The inventive methods and/or the inventive machine controller may be implemented by one or more processors, computers, application specific integrated circuits (ASIC), digital signal processors (DSP), and/or field-programmable gate arrays (FPGA).

Embodiments of the invention allow for an efficient configuration and usage of a predictive machine controller. As the machine learning module can be used to predict the second values, these second values need not to be calculated by the simulation module anymore. This often allows to refrain from a full-fledged simulation of all relevant physical properties of the machine. In particular, those physical properties which would need an expensive simulation may be left to the machine learning module, thus considerably reducing a computational effort. Furthermore, embodiments of the invention also allow for taking into account physical and technical interrelationships of the machine by evaluating a physical compatibility of predictions of the machine learning module with the first physical properties. This often results in a higher prediction accuracy even in machine states which are poorly covered by training data. Accordingly, in many cases less training data are needed for a successful training. Moreover, when using the configured machine controller for controlling the machine, the resulting residuals can be used to estimate an uncertainty or accuracy of the predicted second values, thus enhancing control reliability.

According to an advantageous embodiment of the invention, the at least one first physical property may be a stiffness of the component, a force acting on the component, a heat input to the component, and/or an electromagnetic input to the component. In particular, such a first physical property may be a spatially resolved property. Generally, the at least one first physical property may comprise a given, known, measured, or easily derivable physical property of the component. Hence, the simulation module usually does not need much computational effort to determine the first values from the input data. In particular, a full simulation, which often comprises solving one or more partial differential equations, is usually not required, thus considerably reducing a computational effort.

According to a further advantageous embodiment of the invention, the at least one second physical property may be a strain, deformation, displacement, temperature, fluid property, vibration, or electromagnetic property of the component. In particular, such a second physical property may be a spatially resolved property. Generally, the at least one second physical property may comprise a property which would need much computational effort if classically simulated. In particular, the at least one second physical property may comprise unknown quantities of a physical partial differential equation. Such unknown quantities are those quantities which usually are to be determined by solving the partial differential equation. According to the inventive embodiment, however, these unknown quantities may instead be determined by the machine learning module, thus avoiding an expensive solution of a partial differential equation.

Furthermore, the simulation module may use a finite element method for generating the discretized grid and/or the first values. Alternatively or additionally a finite difference method (FDM) or a finite volume method (FVM) may be used. There are several efficient implementations of those methods available, which can be used for that purpose.

Moreover, the training of the machine learning module may be performed by a reinforcement learning method, a gradient decent method, a particle swarm optimization method, and/or a genetic algorithm. For applying these training methods several efficient implementations are available.

According to an embodiment of the invention, the evaluator may determine the residual as a quantified measure of a non-fulfillment of a discretized physical partial differential equation relating the at least one first physical property as known quantity with the at least one second physical property as unknown quantity. In many cases, a fulfillment or non-fulfillment of a partial differential equation by a trial solution for the unknown quantities can be determined and quantified with much less effort than actually solving that equation.

According to a further embodiment of the invention, the predicted second values may be accepted or discarded for controlling the machine in dependence on the resulting residual. In particular, the resulting residual may be compared with one or more threshold values specifying a tolerance range. Then, the corresponding predicted second value may be accepted if it lies within the range and discarded if it lies outside.

According to an embodiment of the invention, a digital twin of a component of the machine may be constituted by the simulation module and the trained machine learning module. The digital twin may be continuously supplied with operational data of the machine, thus simulating or representing a state or behavior of the component in real-time. The digital twin may also provide operational data or physical data of the machine which are not recorded or measured, which are difficult to measure, or which refer to a future state or behavior of the machine in order to use them for optimized or predictive control.

BRIEF DESCRIPTION

Some of the embodiments will be described in detail, with reference to the following figures, wherein like designations denote like members, wherein.

DETAILED DESCRIPTION

Figure 1:
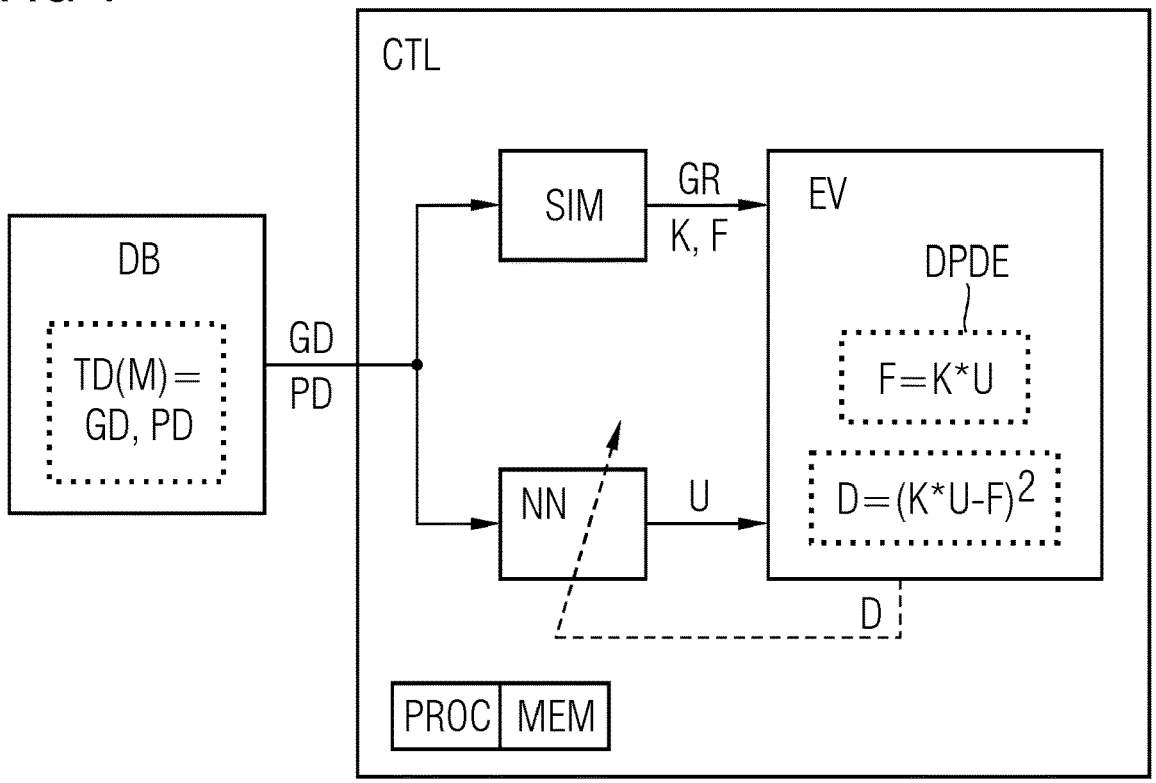
FIG. 1 shows an inventive machine controller in a configuration phase.

FIG. 1 illustrates, in schematic representation, a machine controller CTL in a configuration phase. The machine controller CTL comprises one or more processors PROC for executing method steps of a respective inventive method, and a memory MEM for storing processing data. The memory MEM also comprises non-transient memory for storing a program implementing a respective inventive method.

The machine controller CTL is designed to control a machine M, e.g., a motor, a turbine, a robot, a power plant, a production plant, a combustion engine, a vehicle, or a different technical system. With regard to embodiments of the invention, the term of controlling a machine shall generally also cover a monitoring of the machine or other measures or actions taken by the machine controller CTL which contribute to an operation of the machine M. In the present embodiment it is assumed that the machine M is a motor.

For controlling the machine M effectively, the machine controller CTL should be configured to determine or predict at least one physical, control-relevant property of one or more components of the machine M. With regard to embodiments of the invention the term physical property of a component shall also cover a physical behavior of that component. Such a physical behavior may be regarded as dynamical physical property. For the sake of simplicity only one component of the machine M is explicitly considered in the present embodiment. This component may be e.g., a rotor of the motor M.

According to embodiments of the invention, the configuration is performed by training a machine learning module NN using a simulation module SIM. In the present embodiment, the machine learning module NN and the simulation module SIM are part of the machine controller CTL. The machine learning module NN is implemented as an artificial neural network.

In order to provide training data for training the machine learning module NN a data base DB is coupled to the machine controller CTL. The data base DB contains training data TD of the machine M. The training data TD comprise geometry data GD of the machine M or of a component of the machine M as well as measured physical data PD of the machine M or of its component.

The geometry data GD may comprise data about a geometry, position or orientation of the machine M or of its component, and/or data about a geometrical boundary condition regarding the machine M or its component.

The physical data PD may particularly comprise data about a physical state of the machine M or of its component, or data about an environment of the machine M. This may comprise data about a stiffness, applied or exerted forces, temperatures, vibrations, a thermal input, an electromagnetic input, applied voltages, flowing currents, fluid properties, a rotating speed, a velocity, and/or other physical properties of the machine M or of its component. In an embodiment, at least some of the physical data PD are spatially resolved.

According to the present embodiment the training data TD, including the geometry data GD and the physical data PD, are transmitted from the data base DB to the machine controller CTL. Such a training with stored training data from a data base is often denoted as offline training. Alternatively or additionally, training data may also be received from the running machine M. Such a training with real-time data from a running machine is often denoted as online training.

Within the machine controller CTL, the geometry data GD and the physical data PD are input to both, the simulation module SIM and the machine learning module NN as input data.

The simulation module SIM may be a customary simulator or a module of such a simulator. In particular, the simulation module may comprise or may be part of a so-called FEM solver (FEM: Finite Element Method), FDM solver, or FVM solver, e.g., as provided by customary FEM, FDM or FVM packages.

The simulation module SIM generates by the input data a discretized grid GR specifying a geometry of the component in a spatially discretized form. The generation of the grid GD is generally based on the geometry data GD. Nevertheless, the physical data PD may also be taken into account by that generation, e.g., affecting a refinement of the grid at specific locations. Such a grid generation is a standard task of many customary FEM packages.

Furthermore, according to the present embodiment, the simulation module SIM derives from the physical data PD and the geometry data GD, a stiffness matrix K and a vector of applied or exerted forces F. The stiffness matrix K specifies a stiffness of the component at the nodes of the grid GR. Accordingly, the vector F specifies forces acting on or exerted by the component at the nodes of the grid GR. Generally, the matrix K and the vector F specify values of first physical properties of the component on the grid GR. In the following, the values of the first physical properties of the component are denoted as first values.

In the present embodiment the first physical properties are a spatially resolved stiffness and spatially resolved forces. Additionally or alternatively, the first physical properties may comprise a thermal or electromagnetic input to the component and/or a different given, known, measured, or easily derivable property of the component. In particular, the first physical properties may be chosen in such way that the corresponding first values can be derived on the grid GR without much computational effort, notably without a full-fledged simulation solving a partial differential equation for the component.

In the present case, the behavior of the component follows a physical partial differential equation which relates the first physical properties to one or more second physical properties of the component. In particular, the first physical properties are known variables or quantities of the partial differential equation whereas the second physical properties are unknown variables or quantities of the partial differential equation. This means that for determining values of the second physical properties a solution of the partial differential equation has to be found.

According to the present embodiment, the partial differential equation relates given stiffnesses and forces as first physical properties to an unknown deformation or strain of the component as second physical property. For numerically determining the solution, i.e., the deformation, the partial differential equation is discretized on the grid GR yielding a discretized differential equation DPDE. The unknown deformation or strain is also discretized on the grid GR leading to a vector U representing unknown values of the deformation at the nodes of the grid GR. Such a discretization is a standard task of many customary FEM packages.

The discretized partial differential equation DPDE may then be written as $F=K*U$. For example, the Matrix K multiplied by the vector U should give the vector F. In order to solve the equation a deformation vector U has to be determined so that $K*U-F=0$ is fulfilled.

Now, instead of numerically solving the discretized differential equation DPDE by classical linear algebra solvers, it is intended—according to embodiments of the invention—to determine the deformation vector U by the machine learning module NN from its input data GD and PD. For this purpose, the machine learning module NN should be trained in such a way that its output data, being a result of processing the input data GD and PD, reproduce solutions U of the discretized differential equation DPDE as accurately as possible. In other words, the trained machine learning module NN should work as a predictor for the unknown variables U of the discretized differential equation DPDE. During the training, the output data of the machine learning module NN can be regarded as trial solutions of the discretized differential equation DPDE. Accordingly, the output data of the machine learning module NN are also designated as U in the figures.

As a measure for an accuracy with which output data U of the machine learning module NN solve the discretized differential equation DPDE, a residual D quantifying a non-fulfillment of that equation is calculated by an evaluator EV. For this purpose, the evaluator EV receives the grid GR, the matrix K, and the vector F from the simulation module SIM and the output data U from the machine learning module NN.

The evaluator EV is part of the machine controller CTL and is generally designed to evaluate and quantify a physical compatibility of first values of one or more first physical properties with second values of one or more second physical properties of the component. In the present case the evaluator EV calculates a resulting residual D from the matrix K, the vector F and the output data U as a Euclidian distance between the vector $K*U$ and the vector F, e.g., according to $D=(K*U-F)^2$ or $D=|K*U-F|$. The residual D quantifies the preceding physical compatibility. In a sense, the residual D can be regarded as a prediction loss or solution error of the machine learning module NN. It should be noted that the determination of a fulfillment or non-fulfillment of a discretized partial differential equation usually requires much less computational effort that actual solving that equation by classical methods.

According to embodiments of the invention, the residual D is to be minimized by training the machine learning module NN. Here, the term training generally means that a mapping from input data of a machine learning module to output data of that machine learning module is optimized with regard to predetermined and/or learned criteria during a training phase. In the present case, the criteria comprise a non-fulfillment of the discretized partial differential equation DPDE by the output data U of the machine learning module NN, the non-fulfillment being quantified by the residual D. For minimizing the residual D, several machine learning methods, in particular methods for reinforcement learning are available. The mapping can be optimized by tuning mapping parameters of the machine learning module NN. In case of artificial neural networks, a connective structure of its neurons and/or weights of connections between the neurons may be varied in order to optimize the mapping. For such optimizations a multitude of numerical standard methods, like e.g., gradient descent methods, particle swarm methods, or genetic algorithms are available.

The residuals D determined by the evaluator EV are returned to the machine learning module NN—as indicated by a dashed arrow in FIG. 1—in order to be minimized by adjusting e.g., neural weights of the machine learning module NN. In this way the latter learns dependencies between its input data GD and PD on the one hand and solutions U of the discretized partial differential equation DPDE on the other hand. After a successful training, the machine learning module NN is likely to be able to determine from the input data GD and PD a corresponding solution U, here a deformation or strain, of the discretized partial differential equation DPDE with sufficient precision.

In this way, the trained machine learning module NN constitutes a surrogate model for solving the discretized partial differential equation DPDE, thus dispensing with the need for invoking a full-fledged simulation. Actually, according to the present embodiment, the simulation module SIM has only to provide a specification of the simulation model, namely a discretized grid, discretized first values, and optionally, one or more physical relations between them. Furthermore, it turns out that the adherence to physical laws via the physical differential equation DPDE enhances a robustness, accuracy, and effectiveness of the inventive method considerably.

Figure 2:
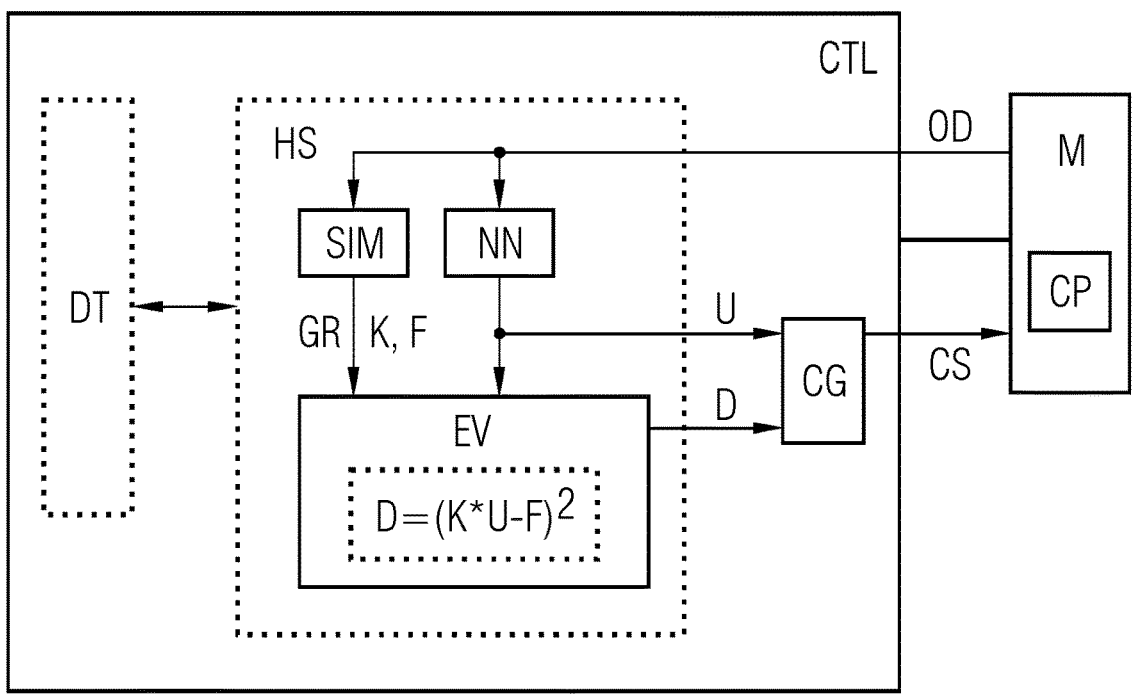
FIG. 2 shows the configured machine controller controlling a machine.

After the training, the machine learning module NN can be used by the machine controller CTL to control the machine M, as illustrated by FIG. 2. Reference signs in FIG. 2 which are identical to those in FIG. 1 denote the same or corresponding entities, which are embodied as described above.

The machine controller CTL is coupled to the running machine M, which comprises a component CP. As already mentioned above, this component CP may be a rotor of a motor.

The machine controller CTL receives from the running machine M operational data OD comprising measured physical data and geometry data of the machine M. Instead of being directly acquired from the machine M, the geometry data may at least partially be acquired from a specification of the machine M. The operational data OD may further specify a status, control actions, a performance, emissions, and/or a resource consumption of the machine M or its environment. For this purpose, the machine M may be equipped with several sensors for measuring and providing process data, machine data, and/or environmental data of the machine M.

The operational data OD are input to the simulation module SIM as well as to the trained machine learning module NN as input data.

As described above, the simulation module SIM generates from the input data a discretized grid GR, a stiffness matrix K, and a vector of applied or exerted forces F. The grid GR, the stiffness matrix K, and the vector F are transmitted from the simulation module SIM to the evaluator EV.

The trained machine learning module NN is executed with the operational data OD and derives from them output data U as a prediction for the solution of the discretized partial differential equation DPDE. According to the present embodiment, that output vector U comprises values of a deformation or strain of the component CP. It should be noticed that an execution of a trained machine learning model usually requires far less computational effort than a full-fledged simulation. Hence, in many cases the solution of the differential equation DPDE can be predicted in real-time.

The predicted output vector U is transmitted from the trained machine learning module NN to the evaluator EV. The evaluator EV then determines from the grid GR, the stiffness matrix K, the vector F, and the output vector U a resulting residual D as described above.

The resulting residual D and the output vector U are then transmitted from the evaluator EV or from the trained machine learning module NN, respectively, to a control signal generator CG of the machine controller CTL. The control signal generator CG generates, depending on the predicted output vector U and the resulting residual D, control signals CS for controlling the machine M. The residual D is used by the control signal generator CG to evaluate an uncertainty or accuracy of the predicted solution U. Depending on the residual D the predicted solution U is accepted or discarded for controlling the machine M. In particular, if the residual D is small, thus indicating a reliable prediction U, the predicted output vector U is used for controlling the machine M. Otherwise, the prediction U is ignored or less weighted.

From the control signal generator CG, the generated control signals CS are transmitted and applied to the machine M for controlling that machine M.

The simulation module SIM, the trained machine learning module NN, and the evaluator EV constitute a hybrid simulator HS for simulating one or more second physical properties, particularly a deformation of the component CP, without the need of classically solving an underlying partial differential equation. Hence, in many cases a computational effort is considerably reduced. Furthermore, the hybrid simulator HS also provides the residual D as a measure for a possible simulation error. This measure is particularly valuable in state space regions which were poorly covered by the available training data TD.

In many cases, the reduced computational effort allows to perform the simulation in real-time. In such cases, the hybrid simulator HS can be used to implement a digital twin DT of the component CP. The hybrid simulator HS or the digital twin DT, respectively, can be continuously supplied with operational data OD of the running machine M, thus simulating or representing a state or behavior of the component CP in real-time and in parallel to the actual operation of the running machine M. The hybrid simulator HS or digital twin DT, respectively, can also provide physical data of the machine M which are not directly measured, or which refer to a future state or behavior of the machine M. These physical data can then be used in real-time for an optimized or predictive control or for a predictive or preventive maintenance of the machine M.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for configuring a machine controller comprising a machine learning module and a simulation module, the method comprising:
    a) receiving geometry data and measured physical data of a machine to be controlled;
    b) inputting the geometry data and the physical data as input data to the machine learning module and to the simulation module;
    c) generating by the simulation module by first values of the input data of at least one first physical property of a component of the machine on a discretized grid;
    d) providing an evaluator for evaluating a physical compatibility of the first values with second values of at least one second physical property of the component different from the at least one first physical property, and for generating a residual quantifying the physical compatibility;
    e) evaluating by the evaluator the physical compatibility of the first values with output data of the machine learning module and generating a resulting residual;
    f) training the machine learning module to minimize the resulting residual, thus configuring the machine controller for controlling the machine by the output data of the trained machine learning module; and
    g) controlling the machine by the output data of the trained machine learning module.

2. The method as claimed in claim 1, wherein
the at least one first physical property is a stiffness of the component, a force acting on the component, a heat input to the component, and/or an electromagnetic input to the component.

3. The method as claimed in claim 1, wherein
the at least one second physical property is a strain, deformation, displacement, temperature, fluid property, vibration, or electromagnetic property of the component.

4. The method as claimed in claim 1, wherein
the simulation module uses a finite element method for generating the discretized grid and/or the first values.

5. The method as claimed in claim 1, wherein
the machine learning module comprises an artificial neural network, a recurrent neural network, a convolutional neural network, a reinforcement learning model, a Bayesian neural network, an autoencoder, a deep learning architecture, a support vector machine, a data driven trainable regression model, a k-nearest-neighbor classifier, a physical model and/or a decision tree.

6. The method as claimed in claim 1, wherein
the training of the machine learning module is performed by a reinforcement learning method, a gradient decent method, a particle swarm optimization method, and/or a genetic algorithm.

7. The method as claimed in claim 1, wherein
the evaluator determines the residual as a quantified measure of a non-fulfillment of a discretized physical partial differential equation relating the at least one first physical property as known quantity to the at least one second physical property as unknown quantity.

8. A machine controller for controlling a machine, configured to perform a method according to claim 1.

9. A computer program product, comprising a computer readable hardware storage device having computer readable program code stored therein, said program code executable by a processor of a computer system to implement the method according to claim 1.

10. A non-transient computer readable storage medium storing a computer program product according to claim 9.

11. A computer-implemented method for controlling a machine, the method comprising:
    providing a machine controller, wherein the machine controller includes a trained machine learning module and a simulation module, wherein the machine controller is a trained machine controller configured for controlling the machine by output data of the trained machine learning module,
    receiving operational data from the machine and inputting them as input data to the trained machine learning module and to the simulation module,
    generating by the simulation module by the input data first values of the at least one first physical property,
    outputting by the trained machine learning module output data as predicted second values of the at least one second physical property,
    generating by the evaluator a resulting residual quantifying a physical compatibility of the first values with the predicted second values, and
    controlling the machine by the predicted second values and the resulting residual.

12. The computer-implemented method as claimed in claim 11, wherein
depending on the resulting residual the predicted second values are accepted or discarded for controlling the machine.

13. The computer-implemented method as claimed in claim 11, wherein
by the simulation module and the trained machine learning module a digital twin of a component of the machine is constituted, and
the digital twin is continuously supplied with operational data of the machine, thus simulating or representing a state or behavior of the component in real-time.

* * * * *